INVENTORS.
WILLIAM F. GROENE,
WALTER R. MEYER,
BY
Allen & Allen
ATTORNEYS.

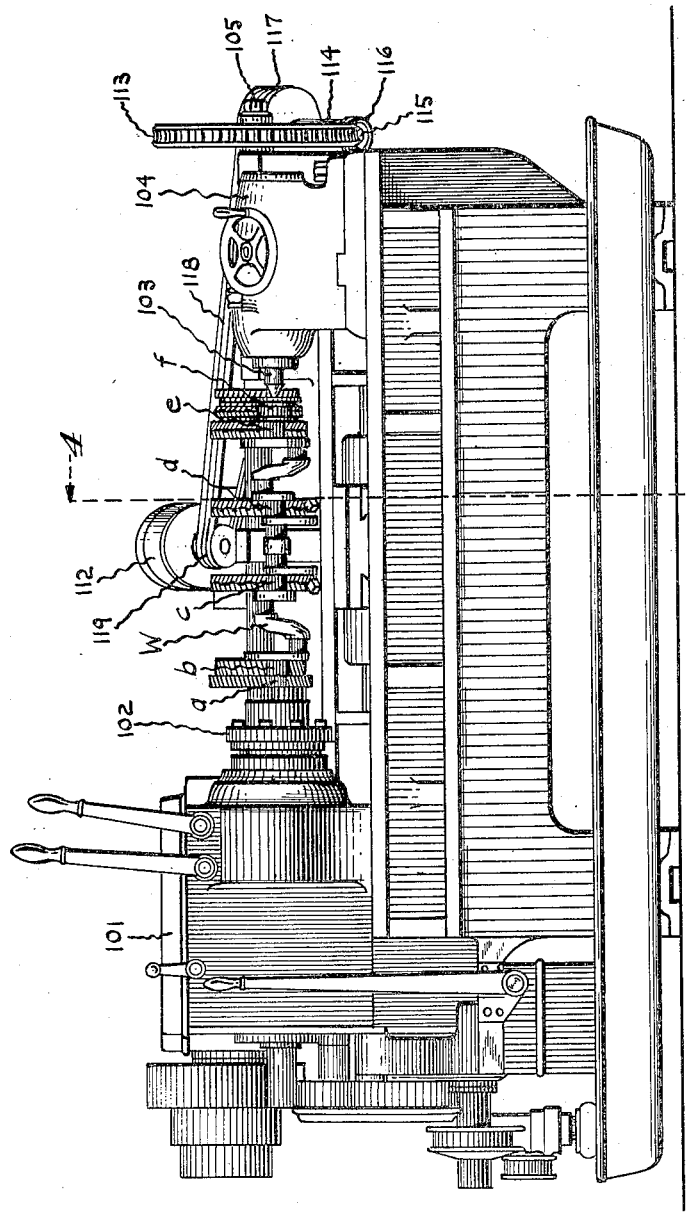

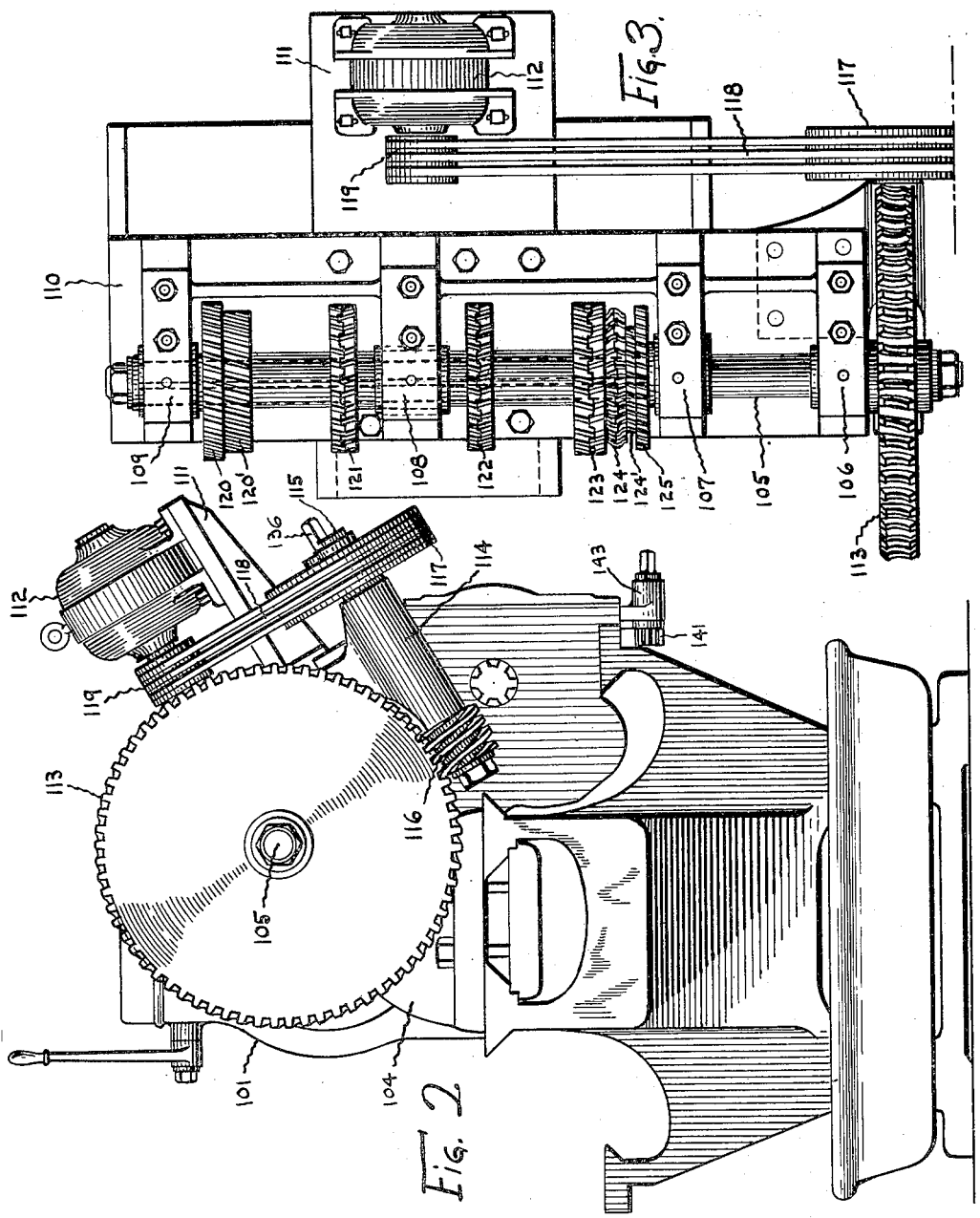

Aug. 17, 1937.  W. F. GROENE ET AL  2,090,119
BROACHING LATHE
Filed April 5, 1935  4 Sheets-Sheet 4

INVENTORS.
WILLIAM F. GROENE,
WALTER R. MEYER,
BY
Allen & Allen
ATTORNEYS.

Patented Aug. 17, 1937

2,090,119

UNITED STATES PATENT OFFICE 2,090,119

BROACHING LATHE

William F. Groene and Walter R. Meyer, Cincinnati, Ohio, assignors to The R. K. Le Blond Machine Tool Company, Cincinnati, Ohio, a corporation of Delaware

REISSUED

SEP 8 1942

Application April 5, 1935, Serial No. 14,866

21 Claims. (Cl. 82—9)

Our invention relates to machine tools, and more especially to machines for turning by a broaching operation. Machines are known in the prior art, in which a broach has been used, and in which there has been a relatively short degree of relative movement of the broach and the rotating work piece which is cut by the broach. However, so far as we are aware, there has not been provided a combination in which the work piece rotates and the broach is moved with reference thereto in a cyclical operation.

An object of our invention is to provide a circular broaching cutter which is revolved relatively slowly in cutting relation to a work piece which is revolving relatively rapidly and at the same time providing means for feeding the circular broaching means radially toward the surface of the work so as to produce a finished surface on said work piece. This arrangement is equally applicable when it is desired to broach an external surface, as when it is desired to broach an internal surface; the only difference is that in the first case there is a radially inward movement while in the second there is a radially outward movement.

It is one of the objects of our invention to increase the efficiency of turning with the aid of a broach, by providing the broach in such a form and so relating this form of broach to a rotating piece of work, as to have a continuous and cyclical operation. We illustrate what is meant by a cyclical operation, for instance, by means in which a broach has a series of cutting teeth arranged in a circle; and in which relative movement of the broach and the rotating work piece is around the circle of arrangement of broach teeth. The circular series of broach teeth may be endless, and the relative movement may be continuous in the same direction throughout such a period as may be desired.

Also the invention is not limited to circularly arranged broaching tools, since cyclical operations do not necessarily imply circular operations within the meaning of the words as used by us.

A circular operation, however, is exemplary of our invention, and is a form which we prefer, and which we will herein describe for the purpose of making an exemplary disclosure.

Our invention is especially applicable to the finishing of cylindrical surfaces on the crank shafts of internal combustion engines, for instance, the line bearings of such shafts, and the flanges and other cylindrical or circular parts concentric with those bearings. It will be understood, however, that our invention is not limited to this use.

It is a further object of our invention preferably at the same time the cylindrical surfaces are finished, to finish portions lying in radial directions; as for instance, the cheeks of the crank webs adjacent to the cylindrical surfaces, or the side portions of flanges, and similar portions, these operations being performed by the circular series of broach teeth while the work piece is rotating.

A further object of our invention is to afford the broaching operation, by a relatively high speed of rotation of the work piece as compared with the speed at which the rotating work piece and the broach teeth relatively travel. Under these conditions, the work piece may be rotated in such a direction that its side engaging the cutting edge of the broach teeth is moving in the direction of the relative approach of the broach teeth and work piece, so as to add the lineal velocity of rotation of the surface being finished to that of the relative movement of the broach teeth and work piece; or the work piece may be rotated in the opposite direction, and the broach teeth pitched in the opposite direction, so that the lineal velocity of relative motion of broach teeth and the work piece is subtracted from that of the surface being cut by the teeth. In this latter case, the speed of rotation of the work piece may be so much greater than the speed of travel of the rotation of the work piece and broach teeth that the subtraction is relatively insignificant. This latter kind of operation affords a more gradual entrance of the tooth cutting edge into the work, with less wear and tear on the broach teeth, less strain on the machine as a whole, and in general, a smoother operation, with greater facility of providing smooth work.

More specifically, an object of our invention is to provide a circular broaching cutter which is revolved relatively slowly in cutting relation to a work piece which is revolving relatively rapidly and at the same time providing means for feeding the circular broaching means radially toward the axis of the work so as to reduce the diameter and adjacent variously extended radial surfaces of a rotating work piece.

Another object is to provide broaching cutters which have teeth arranged in a circle concentric with the axis of rotation of the broaching cutter. By this novel arrangement the broaching cutter may be revolved past the work as frequently as necessary to accomplish the desired machining action, this arrangement being far more practical than using a straight tangential broaching cutter. The straight broach equivalent to the continuously rotatable circular broach would of necessity have to be too long for a practical machine to accomplish the same work done by our circular broaching arrangement.

An advantage of our broaching method is that it is especially well adapted to machining the radially extended surfaces associated with the cylindrical surfaces of a work piece. For instance, with our method the rotating broaching cutter can be started in cutting action radially far removed from the final portion of the finished surface to be machined and fed at a desired feeding rate for proper cutting action of the teeth of the broach on the radially extended faces of the work. For example, in machining the faces of the webs and counter-weights of crank shafts, which may extend radially several times the associated bearing diameter, it is necessary to remove the metal from these faces before machining can be done on the crank bearing itself. In former broaching methods wherein substantially straight broaches are used, and which broaches do not have motion radially toward the axis of rotation of the work, the teeth must be arranged in radially stepped positions so as to accomplish a cutting action toward the axis of the work. The use of the stepped teeth is limited to a given depth of cut which each tooth can efficiently take. This limitation would therefore require an impractically long broach to accomplish the same cutting action as we accomplish with our circular broaching cutter.

Further objects will appear in conjunction with the especially illustrated example, as shown in the accompanying drawings, in which:—

Fig. 1 is a front elevation of a single spindle lathe operating according to the principle of our invention.

Fig. 2 is an end elevation of the same.

Fig. 3 is a plan view of the same.

Essentially in the practice of our invention, we provide means for centering work and rotating the work. We also provide a broach, and means for moving the broach in connection with the work as the work rotates, the whole forming a cyclical operation, at least to the extent that the broaching is automatically carried on to an extent predetermined.

In the example shown in Figs. 1 to 6, inclusive, a circular broach is rotated on an axis parallel with that of rotation of the work piece to be turned. As shown, the broach rotates in the non-cutting direction, but the work piece is rotated so much more rapidly than the broach that a proper relative cutting speed is maintained. This is most clearly seen in Fig. 5. The rotation of the broach in this example serves to bring the various teeth thereof successively into cutting position.

The machine illustrated in this example of Figs. 1 to 6, inclusive, embodies the usual design of a single spindle lathe, which has a head 101 in which is journaled the spindle for the chuck 102, with suitable driving means which needs no detailed description. It is sufficient to say that the work piece W, which as here shown is a crank shaft, has one end held in the chuck 102, and has the other end centered on the center pin 103 mounted in the tail stock 104 as is usual on lathes.

Figure 4:
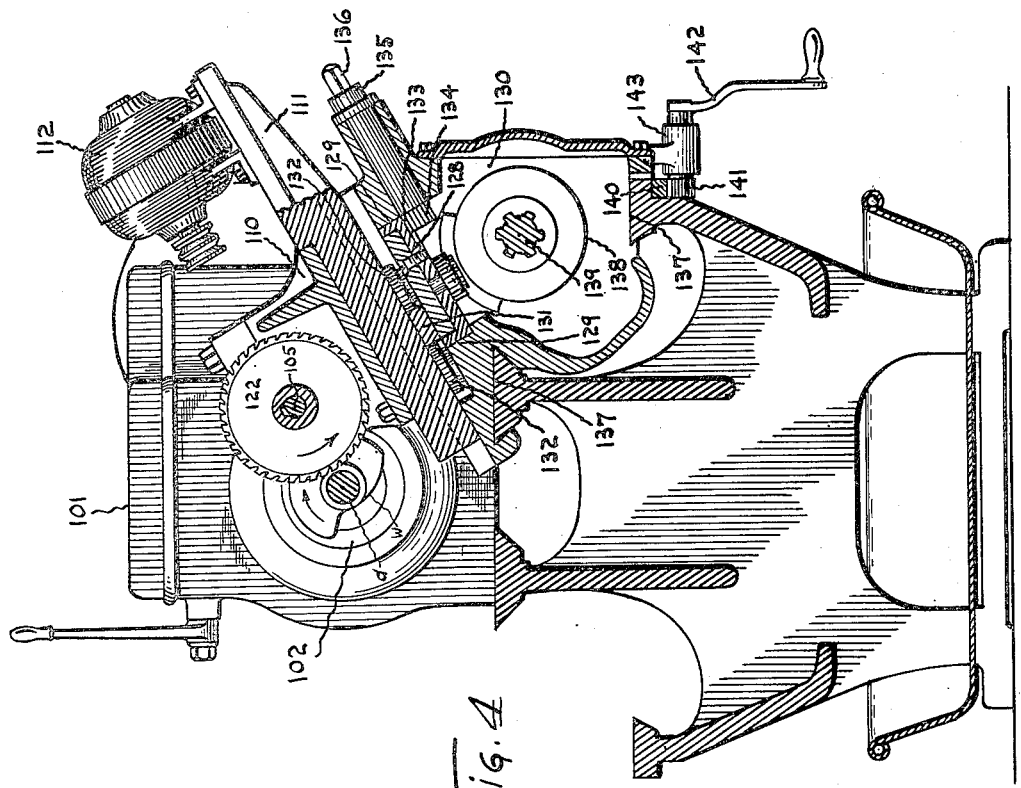
Fig. 4 is a vertical cross section on the line 4, 4 of Fig. 1.

To the rear of the tail stock 104 a shaft 105 is journaled in suitable bearings 106, 107, 108 and 109 (Fig. 3) fixed on a carriage or cross slide 110, which, as seen in Fig. 4, is mounted to slide downwardly and forwardly at right angles to the axes of the work piece and the shaft 105 carried by this cross slide. On an extension 111 of the cross slide 110, at the rear, is mounted an electric motor 112. A worm gear 113 is fixed on the shaft 105, where it extends past the bearing 106 at the tail end of the lathe; and the cross slide 110 has a downward extension with a bearing 114 in which the worm shaft 115 is journaled on an axis parallel to the line of sliding of the cross slide, and this worm shaft 115 has fixed on it a worm 116 meshing with the worm gear 113. This worm shaft 115 also has fixed on it a pulley 117, which is connected by a belt 118 with a pulley 119 on the shaft of the motor 112.

The circular broaches 120, 120', 121, 122, 123, 124, 124' and 125 are fixed on the shaft 105; the first two mentioned broaches 120 and 120' being grouped together near the head end of the shaft to turn the portions a and b of the work piece W; the broaches 121 and 122 turn the line bearings c and d, respectively; the broach 123 turns the line bearing e; and the group of broaches 124, 124' and 125 turn portions of various diameter at f on the work piece W, as may be seen clearly in Fig. 1. The work piece W is rotated at a relatively high speed by the chuck 102, and the broaches are rotated at a relatively low speed by the motor 112 through the speed reducing transmission constituted by the pulleys and belt, and the worm and worm gear.

Figure 6:
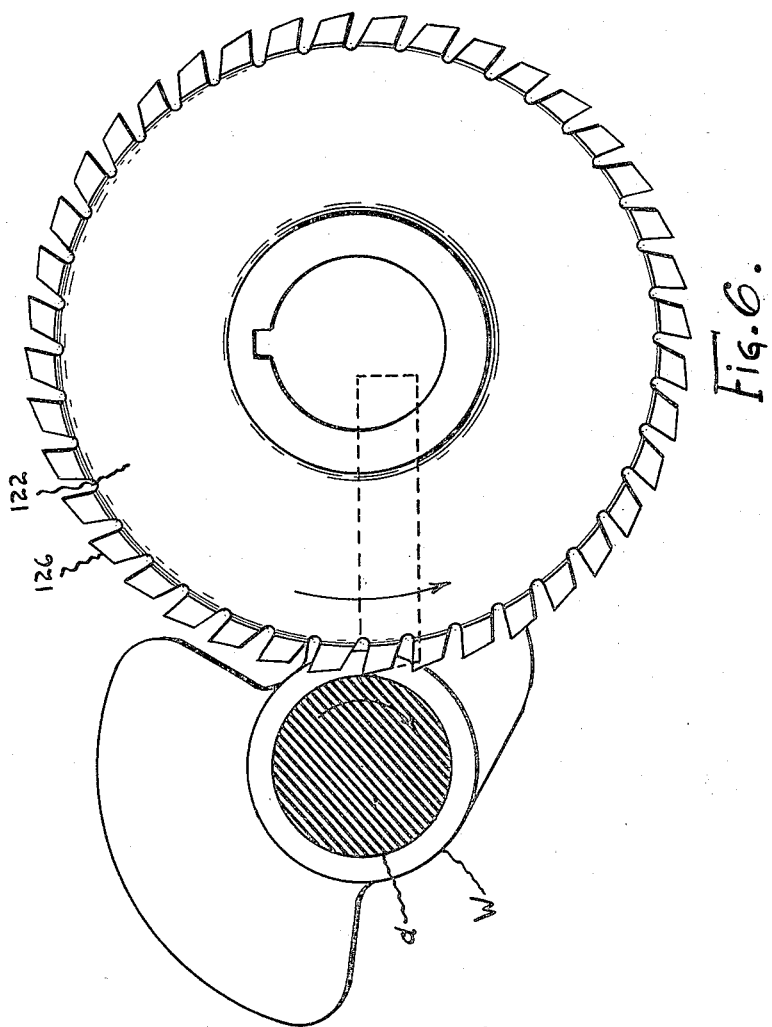
Fig. 6 is a face view of the broach.
Figure 5:
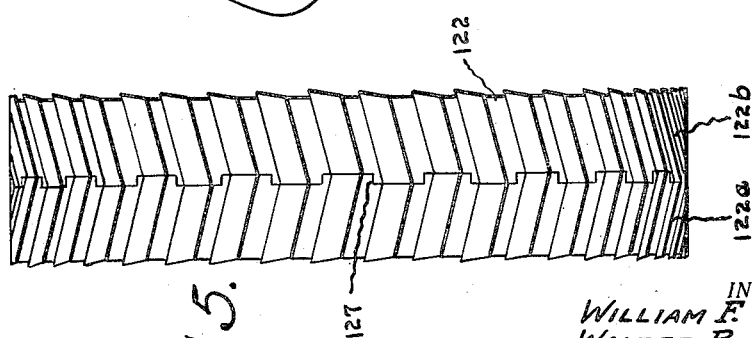
Fig. 5 is an enlarged view of the circular broach operating upon a work piece.

As here shown, the edges of the teeth of each broach may be all on a single circle concentric with the axis of rotation of the broach, as exemplified by the teeth 126 of the broach 122 shown in Fig. 5. Also, as shown in Fig. 6, the teeth preferably are of the herring-bone type, a single broach being made up of sections 122a and 122b fitted together with interengaging portions 127. Such a broach is designed for as many revolutions in the course of a finishing operation as may be desired, accompanied by a suitable rate of feed.

As shown here, particularly in Fig. 4, the feed is effected by means of a cam member 128, slidable in guides 129 in a housing 130 parallel with the axes of the work piece and broaches, and having a form bar 131 fixed thereon, which bar is understood to be suitably inclined relative to said axes; so that rollers 132, journaled on the bottom of the cross slide 110 and closely straddling the form bar 131, will cause cross feeding of the slide or carriage 110 due to the sliding of the cam member 128 in its guides 129.

This cam member 128 has a rack 133, with which meshes a pinion 134 fixed on a shaft 135, journaled in the lathe bed, and having a squared rear end portion 136, to which a crank may be applied for hand feed in either direction.

The housing 130 is mounted on guides 137 on the lathe bed, to be slidable parallel with the axes of the work piece and broaches, and it encloses a cam drum 138, splined on a shaft 139 that extends through and has bearings in the head and tail ends of the housing 130. It will be understood that this shaft 139 is suitably geared to the driving means at the head end of the lathe to rotate the drum 138 at a desired speed; the splined connection permits the housing 130 to be adjusted along the axis of turning of the lathe, to apply the broaches at desired places therealong. This adjustment is effected by means of a rack 140 fixed on the lathe bed next to the lower rear housing, guides 137 and a pinion 141 meshing with this rack 140 and fixed on the shaft of a crank handle 142, which shaft is journaled in a bearing 143 fixed to and depending from the lower rear part of the housing 130. From the foregoing explanation, the operation of the device of Figs. 1 to 6, inclusive, will be clear.

Modifications may be made in our invention without departing from the spirit thereof.

Having thus described our invention, what we claim as new and desire to secure by Letters Patent, is:—

1. In a broaching lathe, a rotatable work holder, means for rotating said work holder, a work piece in said work holder, a rotatable broaching means having cutting teeth arranged in a circle concentric with the axis of rotation of said broaching means, means for rotating said broaching means, and means for moving said broaching means, while rotating, relative to said work piece, while rotating, so that said work piece will be machined by broaching.

2. In a broaching lathe, a rotatable work holder, means for rotating said work holder at cutting speed, a work piece in said work holder, a rotatable broaching means having cutting teeth arranged in a circle concentric with the axis of rotation of said broaching means, means for rotating said broaching means at feeding speed, and means for causing relative movement between the axis of rotation of said work piece and the axis of rotation of said broaching means.

3. In a machine for broaching portions of crank shafts, a rotatable work holder, driving means for rotating said work holder, a rotatable broaching cutter having its cutting teeth arranged in a circle concentric with its axis of rotation and having cutting teeth presented axially thereof, means for rotating said broaching cutter, means for causing relative feeding of said broaching cutter, while rotating, and said work piece, while rotating, so that the bearing surfaces and associated various radially extended surfaces may be machined by broaching.

4. In a broaching lathe, broaching means having a series of broach teeth arranged in conformity to a prearranged circular path of travel of the work, a work holder, means for causing rotation of a work piece held therein, means for causing said work holder to follow said circular path of travel, and means for causing relative radial movement between said broach teeth and said axis of rotation of said work piece.

5. In a broaching lathe, a work holder, means for causing rotation of a work piece held therein, a rotatable broaching cutter having teeth presented in a circle concentric with its axis of rotation, means for producing relative circular movement between said broach teeth and the work piece held in said work holder, the relative movement of the broach teeth and work holder and the rotation of the work holder being in the same direction and the broach teeth having their cutting edges presented in the opposite direction, and means for moving said cutter radially of the axis of rotation of said work piece.

6. A machine as set forth in claim 5 in which the relative circular movement of the broach teeth and work holder and the rotation of the work holder are in opposite directions, and in which the broach teeth have their cutting edges presented in the direction of said relative movement.

7. A process of broaching a rotating work piece comprising subjecting said work piece while rotating at relatively high speed to the action of a circular broaching cutter rotating at relatively low speed by causing relative movement between the respective axes of rotation of said work piece and said broaching cutter.

8. A process of broaching a rotating work piece which comprises rotating said work piece, simultaneously producing a relative movement of said work piece and a broach along a predetermined line of arrangement of teeth of said broach, and also simultaneously moving said broach radially of the axis of rotation of said work piece to produce a progressive cutting action of said broach on said work piece.

9. The method of working metal which comprises supporting a work piece adjacent a rotatable broaching cutter having helically arranged cutting edges, simultaneously rotating the work piece at cutting speed, and moving the work piece radially toward the axis of the cutter to effect a feeding movement between the work piece and the cutter.

10. In a broaching lathe, a rotatable work holder, a work piece in said work holder, a rotatable broaching cutter, means for rotating said work holder and said broaching cutter so that the peripheral speed of the work piece will be relatively greater than the peripheral speed of said broaching cutter, and means for causing a relative feeding movement between the axes of the work piece and the cutter.

11. A broaching lathe comprising, a rotatable work holder, a broaching means, and means for simultaneously rotating said work holder, moving said broaching means radially of the axis of said work holder, and moving said broaching means substantially perpendicularly to said line of radial movement.

12. A broaching lathe comprising, a rotatable work holder, a broaching means having cutting teeth arranged in a predetermined path of relative travel between said teeth and a work piece held in said work holder, and means for simultaneously rotating said work holder, producing said relative travel, and bodily moving said broaching means radially of the axis of rotation of said work piece.

13. A broaching lathe comprising, a rotatable work holder, a rotatable broaching means, and means for simultaneously rotating said work holder, rotating said broaching means, and causing relative movement between the axes of said work holder and said broaching means.

14. A broaching lathe comprising, a rotatable work holder, a rotatable broaching means having cutting teeth arranged in a predetermined circular path of relative travel between said teeth and a work piece held in said work holder, and means for simultaneously rotating said work holder, producing said relative travel, and bodily moving said broaching means radially of the axis of rotation of said work piece.

15. In a crankshaft broaching lathe, means for chucking and rotating a crankshaft, broaching means, and means for simultaneously rotating said crankshaft, moving said broaching means radially of the axis of rotation of said crankshaft in said lathe and moving said broaching means substantially perpendicularly to said line of radial movement whereby bearing portions and associated surfaces may be machined on said crankshaft.

16. In a crankshaft broaching lathe, means for chucking and rotating a crankshaft with its line bearings, flange and stub ends displaced from said means, broaching means, and means for simultaneously rotating said crankshaft, moving said broaching means radially of the axis of rotation of said crankshaft in said lathe, and moving said broaching means substantially perpendicularly to said line of radial movement whereby the line bearings, flange and stub ends of said crankshaft may be simultaneously finished by broaching.

17. In a crankshaft broaching lathe, means for chucking and rotating a crankshaft, rotatable broaching means, and means for simultaneously rotating said crankshaft, rotating said broaching means, and causing relative movement between the axis of rotation of said crankshaft and the axis of rotation of said broaching means whereby bearing portions and associated surfaces may be machined on said crankshaft.

18. In a crankshaft broaching lathe, means for chucking and rotating a crankshaft with its line bearings, flange and stub ends displaced from said means, rotatable broaching means, and means for simultaneously rotating said crankshaft, rotating said broaching means, and causing relative movement between the axis of rotation of said crankshaft and the axis of rotation of said broaching means whereby said line bearings, flange and stub ends of said crankshaft may be simultaneously machined by broaching.

19. In a broaching lathe, a rotatable work holder, a work piece in said work holder, a rotatable broaching cutter, means for rotating the broaching cutter and means for simultaneously rotating the work holder at a greater peripheral speed than the broaching cutter and causing relative movement between the axes of rotation of the work piece and of the broaching cutter.

20. In a broaching lathe, a rotatable work holder, a work piece in said work holder, a broaching means having broaching teeth arranged in a path of travel substantially tangent to a cylindrical surface to be machined on said work piece, and means for simultaneously rotating said work holder, moving said teeth in said path of travel, and bodily moving said broaching means relative to the axis of rotation of said work piece.

21. In a broaching lathe, a rotatable work holder, a work piece in said work holder, a rotary broaching means having broaching teeth arranged in a circular path of travel substantially tangent to a cylindrical surface to be machined on said work piece, and means for simultaneously rotating said work holder, moving said teeth in said path of travel, and bodily moving said broaching means relative to the axis of rotation of said work piece.

WILLIAM F. GROENE.
WALTER R. MEYER.